United States Patent
Yamamoto et al.

(10) Patent No.: US 11,211,672 B2
(45) Date of Patent: Dec. 28, 2021

(54) LDH SEPARATOR AND ZINC SECONDARY BATTERY

(71) Applicant: NGK INSULATORS, LTD., Nagoya (JP)

(72) Inventors: Sho Yamamoto, Nagoya (JP); Naoko Inukai, Nagoya (JP); Shohei Yokoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/189,765

(22) Filed: Mar. 2, 2021

(65) Prior Publication Data

US 2021/0218112 A1 Jul. 15, 2021

Related U.S. Application Data

(63) Continuation of application No. PCT/JP2019/042555, filed on Oct. 30, 2019.

(30) Foreign Application Priority Data

Dec. 13, 2018 (WO) .................. PCT/JP2018/045885
Dec. 13, 2018 (WO) .................. PCT/JP2018/045887
(Continued)

(51) Int. Cl.
*H01M 50/449* (2021.01)
*H01M 10/36* (2010.01)
(Continued)

(52) U.S. Cl.
CPC ......... *H01M 50/449* (2021.01); *H01M 10/36* (2013.01); *H01M 50/417* (2021.01);
(Continued)

(58) Field of Classification Search
CPC . H01M 50/466; H01M 50/409; H01M 50/449
See application file for complete search history.

(56) References Cited

U.S. PATENT DOCUMENTS 9,293,791 B2  3/2016 Yamada et al.
9,391,349 B2  7/2016 Yamada et al.
(Continued)

FOREIGN PATENT DOCUMENTS

CN  104221214 A  12/2014
JP  2016-115540 A1  6/2016
(Continued)

OTHER PUBLICATIONS

International Search Report (Application No. PCT/JP2019/042555) dated Jan. 21, 2020 (with English translation).
(Continued)

*Primary Examiner* — Stephan J Essex
(74) *Attorney, Agent, or Firm* — Burr & Brown, PLLC

(57) ABSTRACT

Provided is an LDH separator including a porous substrate and a layered double hydroxide (LDH) that fills up pores of the porous substrate. The LDH is composed of a plurality of hydroxide base layers containing Mg, Al, Ti, and OH group; and interlayers which are interposed between the plurality of hydroxide base layers and composed of anions and $H_2O$.

10 Claims, 6 Drawing Sheets

(30) Foreign Application Priority Data

| Dec. 13, 2018 | (WO) | PCT/JP2018/045889 |
| Dec. 14, 2018 | (WO) | PCT/JP2018/046171 |
| Dec. 25, 2018 | (WO) | PCT/JP2018/047686 |
| Jun. 14, 2019 | (JP) | JP2019-111515 |

(51) Int. Cl.
    *H01M 50/417* (2021.01)
    *H01M 50/429* (2021.01)
    *H01M 50/446* (2021.01)
    *H01M 50/491* (2021.01)

(52) U.S. Cl.
    CPC ..... *H01M 50/4295* (2021.01); *H01M 50/446* (2021.01); *H01M 50/491* (2021.01)

(56) References Cited

U.S. PATENT DOCUMENTS

| 10,290,847 | B2 | 5/2019 | Kitoh et al. | |
| 10,773,486 | B2 | 9/2020 | Yamamoto et al. | |
| 2015/0340680 | A1* | 11/2015 | Fujisaki | H01M 8/1016 429/402 |
| 2017/0077476 | A1* | 3/2017 | Kitoh | H01M 50/449 |
| 2017/0214019 | A1 | 7/2017 | Yokoyama et al. | |
| 2019/0123322 | A1 | 4/2019 | Yamamoto et al. | |
| 2019/0126589 | A1 | 5/2019 | Yamamoto et al. | |
| 2020/0220158 | A1* | 7/2020 | Matsuya | H01M 12/08 |

FOREIGN PATENT DOCUMENTS

| WO | 2013/118561 A1 | 8/2013 |
| WO | 2016/067884 A1 | 5/2016 |
| WO | 2016/076047 A1 | 5/2016 |
| WO | 2017/221497 A1 | 12/2017 |
| WO | 2017/221498 A1 | 12/2017 |
| WO | 2017/221531 A1 | 12/2017 |
| WO | 2017/221989 A1 | 12/2017 |
| WO | 2018/135117 A1 | 7/2018 |

OTHER PUBLICATIONS

International Written Opinion (Application No. PCT/JP2019/042555) dated Jan. 21, 2020 (with English translation).
English translation of the Written Opinion of the International Searching Authority (PCT/JP2019/042555) (Chapter I) (PCT/ISA/237) as issued by WIPO dated Apr. 1, 2021.
Chinese Office Action (with English translation), Chinese Application No. 201980057489.7, dated Sep. 24, 2021 (13 pages).

* cited by examiner

LDH SEPARATOR AND ZINC SECONDARY BATTERY

CROSS-REFERENCE TO RELATED APPLICATIONS

This application is a continuation application of PCT/JP2019/042555 filed Oct. 30, 2019, which claims priority to PCT/JP2018/045885 filed Dec. 13, 2018, PCT/JP2018/045887 filed Dec. 13, 2018, PCT/JP2018/045889 filed Dec. 13, 2018, PCT/JP2018/046171 filed Dec. 14, 2018, PCT/JP2018/047686 filed Dec. 25, 2018, and Japanese Patent Application No. 2019-111515 filed Jun. 14, 2019, the entire contents all of which are incorporated herein by reference.

BACKGROUND OF THE INVENTION

1. Field of the Invention

The present invention relates to an LDH separator and a zinc secondary battery.

2. Description of the Related Art

In zinc secondary batteries such as nickel-zinc secondary batteries and air-zinc secondary batteries, metallic zinc precipitates from a negative electrode in the form of dendrites upon charge, and penetrates into voids of a separator such as a nonwoven fabric and reaches a positive electrode, which is known to result in bringing about short-circuiting. The short circuit due to such zinc dendrites shortens a life in repeated charge/discharge conditions.

In order to deal with the above issues, batteries including layered double hydroxide (LDH) separators that prevent penetration of zinc dendrites while selectively permeating hydroxide ions, have been proposed. The layered double hydroxide (LDH) is a material having ion-exchangeable anions and $H_2O$ as interlayers between stacked hydroxide base layers. For example, Patent Literature 1 (WO2013/118561) discloses that an LDH separator is provided between a positive electrode and a negative electrode in a nickel-zinc secondary battery. Moreover, Patent Literature 2 (WO2016/076047) discloses a separator structure including an LDH separator fitted or joined to a resin outer frame, and discloses that the LDH separator has a high denseness to the degree that it has a gas impermeability and/or a water impermeability. Moreover, this literature also discloses that the LDH separator can be composited with porous substrate. Further, Patent Literature 3 (WO2016/067884) discloses various methods for forming an LDH dense membrane on a surface of a porous substrate to obtain a composite material (LDH separator). This method comprises steps of uniformly adhering a starting material that can impart a starting point for LDH crystal growth to a porous substrate and subjecting the porous substrate to hydrothermal treatment in an aqueous solution of raw materials to form an LDH dense membrane on the surface of the porous substrate. Any of LDHs disclosed in the examples of Patent Literatures 1 to 3 is a Mg, Al-LDH in which a hydroxide base layer comprises Mg and Al.

On the other hand, Patent Literature 4 (WO2017/221989) discloses an LDH-containing functional layer and a composite material (i.e., LDH separator) including an LDH which is composed of a plurality of hydroxide base layers containing Ni, Al, and Ti and OH groups, and interlayers which are interposed between the plurality of hydroxide base layers and composed of anions and $H_2O$. Moreover, Patent Literature 5 (WO2017/221531) discloses an LDH-containing functional layer and a composite material (i.e., LDH separator) including an LDH which is composed of a plurality of hydroxide base layers composed of Ni, Ti, and OH groups, and interlayers which are interposed between the plurality of hydroxide base layers and composed of anions and $H_2O$.

CITATION LIST

Patent Literature

Patent Literature 1: WO2013/118561
Patent Literature 2: WO2016/076047
Patent Literature 3: WO2016/067884
Patent Literature 4: WO2017/221989
Patent Literature 5: WO2017/221531

SUMMARY OF THE INVENTION

When a zinc secondary battery such as a nickel-zinc battery is composed by using the LDH separator as described above, a short circuit, etc., due to zinc dendrites can be prevented to some extent. However, further improvement on an effect of dendrite short-circuit prevention is desired.

The present inventors have currently found that by employing an LDH whose basic hydroxide layers are composed of predetermined elements or ions including Mg, Al, Ti, and OH groups, it is possible to provide an LDH separator that can further effectively inhibit short circuits due to zinc dendrites.

Accordingly, an object of the present invention is to provide an LDH separator that can further effectively inhibit short circuits due to zinc dendrites.

According to an aspect of the present invention, there is provided an LDH separator comprising a porous substrate and a layered double hydroxide (LDH) that fills up pores of the porous substrate,
wherein the LDH is composed of a plurality of hydroxide base layers comprising Mg, Al, Ti, and OH groups, and interlayers which are interposed between the plurality of hydroxide base layers and composed of anions and $H_2O$.

According to another aspect of the present invention, there is provided a zinc secondary battery comprising the LDH separator.

According to another aspect of the present invention, there is provided a solid alkaline fuel cell comprising the LDH separator.

DETAILED DESCRIPTION OF THE INVENTION

LDH Separator

Figure 1:
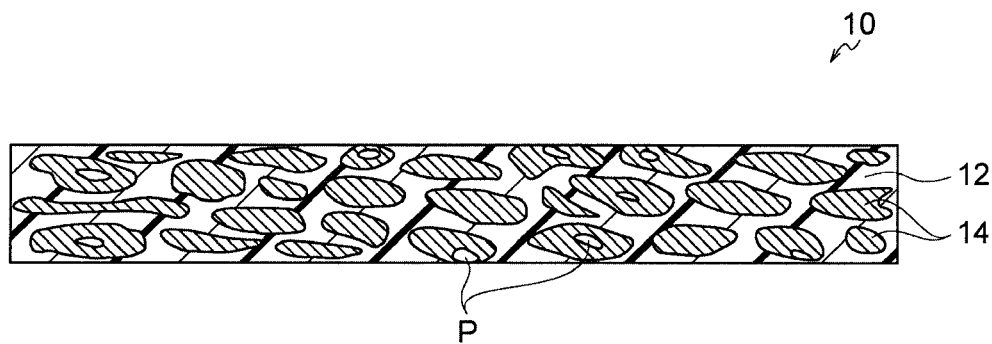
FIG. 1 is a schematic cross-sectional view of the conceptual LDH separator of the present invention.

As the schematic cross-sectional view is conceptually illustrated in FIG. 1, the LDH separator 10 of the present invention comprises a porous substrate 12 and a layered double hydroxide (LDH) 14. As defined herein, "LDH separator" refers to a separator comprising an LDH, which selectively passes hydroxide ions by solely utilizing the hydroxide-ion conductivity of the LDH. Incidentally, in FIG. 1, the LDH 14 region is drawn so as not to be connected between the upper surface and the lower surface of the LDH separator 10, because it is drawn two-dimensionally as a cross section, and the LDH 14 region is connected between the upper surface and the lower surface of the LDH separator 10 in a three-dimension, where depth is taken into consideration, whereby the hydroxide-ion conductivity of the LDH separator 10 is ensured. In the LDH separator 10, the LDH 14 fills up pores of the porous substrate 12. However, the pores of the porous substrate 12 are not necessarily completely filled up, and residual pores P may be slightly present. This LDH 14 is composed of a plurality of hydroxide base layers and interlayers interposed therebetween. The hydroxide base layer comprises Mg, Al, Ti, and OH groups. The interlayers are composed of anions and $H_2O$. The alternating stacked structure itself of the hydroxide base layer and the interlayer is basically the same as the generally known alternating stacked structure of LDH, however, the present invention can provide an LDH separator that is capable of further effectively inhibiting short circuits due to zinc dendrites by an LDH hydroxide base layer composed of predetermined elements or ions containing Mg, Al, Ti, and OH groups.

As described above, the hydroxide base layer of the LDH 14 in the present invention comprises Mg, Al, Ti, and OH groups. Mg in the LDH 14 can take the form of a magnesium ion. The magnesium ion in the LDH 14 is typically considered to be $Mg^{2+}$, but is not particularly limited because magnesium ion might have another valence. Al in the LDH 14 can take the form of an aluminum ion. The aluminum ion in the LDH 14 is typically considered to be $Al^{3+}$, but is not particularly limited because the aluminum ion might have another valence. Ti in the LDH 14 can take the form of a titanium ion. The titanium ion in the LDH 14 is typically considered to be $Ti^{4+}$, but is not particularly limited because the titanium ion might have another valence such as $Ti^{3+}$. The hydroxide base layer may comprise other elements or ions provided it comprises Mg, Al, Ti, and OH groups. For example, the LDH 14 or hydroxide base layer may comprise Y and/or Zn. Moreover, when Y and/or Zn is contained in the LDH or hydroxide base layer, Al or Ti may not be contained in the LDH or hydroxide base layer. However, the hydroxide base layer preferably comprises Mg, Al, Ti, and OH groups as major components. Namely, the hydroxide base layer is preferably mainly composed of Mg, Al, Ti, and OH groups. Therefore, the hydroxide base layer is typically composed of Mg, Al, Ti, OH groups and, in some cases, unavoidable impurities. The unavoidable impurity is an arbitrary element that can be unavoidably mixed in the manufacturing method, and can be mixed in the LDH 14, for example, derived from raw materials or a substrate. The interlayer of LDH 14 included in the LDH separator 10 is composed of anions and $H_2O$. The anion is a monovalent or higher anion, preferably a monovalent or divalent ion. The anion in the LDH 14 preferably comprises $OH^-$ and/or $CO_3^{2-}$. As described above, since valences of Mg, Al, and Ti are not always fixed, it is impractical or impossible to strictly specify an LDH by a general formula. Assuming that the hydroxide base layer is mainly composed of $Mg^{2+}$, $Al^{3+}$, $Ti^{4+}$, and OH groups, the corresponding LDH can be represented by the general formula of a basic composition: $Mg^{2+}_{1-x-y}Al^{3+}_{x}Ti^{4+}_{y}(OH)_2A^{n-}_{(x+2y)/n}\cdot mH_2O$ wherein $A^{n-}$ is an n-valent anion, n is an integer of 1 or more and preferably 1 or 2, $0<x<1$, $0<y<1$, $0<x+y<1$, m is 0 or more and typically a real number greater than 0 or 1 or more. However, the above general formula should just be understood as "basic composition" and it should be understood as replaceable with other elements or ions (including elements or ions having other valences of the same elements, or elements or ions that can be unavoidably mixed due to the manufacturing method) to the extent that elements such as $Mg^{2+}$, $Al^{3+}$, and $Ti^{4+}$ do not impair the basic characteristics of an LDH.

The LDH separator 10 preferably has an atomic ratio of Ti/Al in the LDH 14 of 0.5 to 12 and more preferably 1.0 to 12, as determined by energy dispersive X-ray analysis (EDS). Within the above range, the effect of inhibiting a short circuit caused by zinc dendrites (i.e., dendrite resistance) can be more effectively realized without impairing an ionic conductivity. For the same reason, the atomic ratio of Ti/(Mg+Ti+Al) in the LDH 14, as determined by energy dispersive X-ray analysis (EDS), is preferably 0.1 to 0.7 and more preferably 0.2 to 0.7. Moreover, the atomic ratio of Al/(Mg+Ti+Al) in the LDH 14 is preferably 0.05 to 0.4 and more preferably 0.05 to 0.25. Further, the atomic ratio of Mg/(Mg+Ti+Al) in the LDH 14 is preferably 0.2 to 0.7 and more preferably 0.2 to 0.6. The EDS analysis is preferably carried out with an EDS analyzer (for example, X-act manufactured by Oxford Instruments) by 1) capturing an image at an accelerating voltage of 20 kV and a magnification of 5,000 times, 2) carrying out a three-point analysis at about 5 μm intervals in a point analysis mode, 3) repeating the above 1) and 2) once more, and 4) calculating an average value of a total of 6 points.

The LDH separator 10 preferably has an ionic conductivity of 0.1 mS/cm or more, more preferably 1.0 mS/cm or more, still more preferably 1.5 mS/cm or more, and particularly preferably 2.0 mS/cm or more. Within such a range, the LDH separator can exhibit a sufficient function as a hydroxide-ion conductive separator. The higher the ionic conductivity is, the better it becomes, and therefore, the upper limit is not particularly limited, but is, for example, 10 mS/cm. The ionic conductivity is calculated based on a resistance of the LDH separator and a thickness and an area of the LDH separator. The resistance of the LDH separator 10 can be determined from obtaining an intercept of a real axis as the resistance of the LDH separator by subjecting the LDH separator 10 immersed in a KOH aqueous solution having a predetermined concentration (for example, 5.4 M) to measurement using an electrochemical measurement system (potentio/galvanostat-frequency response analyzer) at a frequency range of 1 MHz to 0.1 Hz and an applied voltage of 10 mV.

The LDH separator 10 is a separator comprising the layered double hydroxide (LDH) 14, and isolates a positive electrode plate and a negative electrode plate so as to be hydroxide-ion conductive when incorporated in a zinc secondary battery. Namely, the LDH separator 10 exhibits a function as a hydroxide-ion conductive separator. The preferred LDH separator 10 has a gas impermeability and/or a water impermeability. In other words, the LDH separator 10 is preferably densified to such an extent that it has a gas impermeability and/or a water impermeability. Incidentally, as described in Patent Literatures 2 and 3 and used herein, "having a gas impermeability" means that even if helium gas is brought into contact with one side of an object to be measured in water at a differential pressure of 0.5 atm, generation of bubbles due to helium gas is not observed from another side. Moreover, as described in Patent Literatures 2 and 3 and used herein, "having a water impermeability" refers to allowing no permeation of water in contact with one side of an object to be measured to another side. Namely, the LDH separator 10 having a gas impermeability and/or a water impermeability refers to the LDH separator 10 having a high denseness to the degree that it does not allow a gas or water to pass through, and refers not to a porous film or other porous material that has a water permeability or a gas permeability. In such a manner, the LDH separator 10 selectively allows only hydroxide ions to pass through due to its hydroxide-ion conductivity, and can exhibit a function as a battery separator. Therefore, the composition thereof is extremely effective in physically blocking penetration of the separator by the zinc dendrites generated upon charge to prevent a short circuit between the positive and negative electrodes. Since the LDH separator 10 has a hydroxide-ion conductivity, it enables efficient movement of necessary hydroxide ions between the positive electrode plate and the negative electrode plate, and can realize a charge/discharge reaction in the positive electrode plate and the negative electrode plate.

The LDH separator 10 preferably has a He permeability of 10 cm/min·atm or less per unit area, more preferably 5.0 cm/min·atm or less, and further preferably 1.0 cm/min·atm or less. It can be said that the LDH separator 10 having the He permeability within such a range has an extremely high denseness. Therefore, a separator having a He permeability of 10 cm/min·atm or less can block passage of substances other than hydroxide ions at a high level. For example, in the case of a zinc secondary battery, permeation of Zn (typically permeation of zinc ions or zincate ions) in an electrolytic solution can be inhibited extremely effectively. The He permeability is measured via a step of supplying He gas to one surface of a separator to allow it to permeate the He gas, and a step of calculating a He permeability and evaluating a denseness of the hydroxide-ion conductive separator. The He permeability is calculated by the formula of $F/(P \times S)$ using a permeation amount F of He gas per unit time, a differential pressure P applied to a separator when the He gas permeates, and a membrane area S through which the He gas permeates. By evaluating the gas permeability using the He gas in such a manner, it is possible to evaluate denseness (dense or sparse) at an extremely high level, and as a result, it is possible to effectively evaluate a high denseness such that substances other than hydroxide ions (particularly Zn bringing about zinc dendrite growth) are not allowed to be permeated as much as possible (only a trace amount is permeated). This is because He gas has the smallest constituent unit among a wide variety of atomic and molecular species that can compose a gas, and has extremely low reactivity. Namely, a single He atom composes He gas without forming a molecule. In this respect, since a hydrogen gas is composed of $H_2$ molecules, the single He atom is smaller as a gas constituent unit. In the first place, $H_2$ gas is dangerous because it is a flammable gas. Then, by adopting an index of the He gas permeability defined by the above formula, it is possible to easily conduct objective evaluation relating to the denseness regardless of differences in various sample sizes and measurement conditions. Thus, it is possible to easily, safely, and effectively evaluate whether or not the separator has a sufficiently high denseness suitable for a separator for zinc secondary batteries. The measurement of a He permeability can be preferably carried out according to the procedure shown in Evaluation 4 of Examples, as will be described below.

As described above, the LDH separator 10 comprises the LDH 14 and porous substrate 12 (typically composed of the porous substrate 12 and LDH 14), and the LDH fills up pores of the porous substrate so that the LDH separator 10 exhibits a hydroxide-ion conductivity and a gas impermeability (and therefore to function as an LDH separator exhibiting a hydroxide-ion conductivity). The LDH 14 is particularly preferably incorporated over the entire region of the porous substrate 12 in the thickness direction thereof. The thickness of the LDH separator 10 is preferably 3 to 80 μm, more preferably 3 to 60 μm, and even more preferably 3 to 40 μm.

The porous substrate 12 is preferably composed of at least one selected from the group consisting of ceramic materials, metallic materials, and polymer materials, and is more preferably composed of at least one selected from the group consisting of ceramic materials and polymer materials. In this case, the ceramic material preferably includes, for example, alumina, zirconia, titania, magnesia, spinel, calcia, cordierite, zeolite, mullite, ferrite, zinc oxide, silicon carbide, and any combination thereof, and it more preferably includes alumina, zirconia, titania, and any combination thereof, and particularly preferably alumina, zirconia (for example, yttria-stabilized zirconia (YSZ)), and combinations thereof. When these porous ceramics are used, formation of an LDH separator having an excellent denseness is facilitated. The metallic materials preferably include, for example, aluminum, zinc, and nickel.

The porous substrate 12 is particularly preferably composed of a polymer material. The polymer porous substrate has advantages of 1) flexibility (hence, it is hard to break even if being thin.), 2) facilitation of increase in porosity, 3) facilitation of increase in a conductivity (because it can be rendered thin while increasing porosity.), and 4) facilitation of manufacture and handling. Moreover, by taking advantage of the flexibility of 1) above, it also has 5) an advantage of capable of easily bending or jointing by sealing, an LDH separator comprising a porous substrate made of a polymer material. The polymer material preferably includes, for example, polystyrene, polyether sulfone, polypropylene, an epoxy resin, polyphenylene sulfide, a fluororesin (tetrafluororesin: PTFE, etc.), cellulose, nylon, polyethylene, and any combination thereof. More preferably, from the viewpoint of a thermoplastic resin suitable for heat pressing, it includes polystyrene, polyether sulfone, polypropylene, epoxy resin, polyphenylene sulfide, a fluororesin (tetrafluororesin: PTFE, etc.), nylon, polyethylene, any combination thereof, etc. All of the various preferred materials described above have alkali resistance as resistance to an electrolytic solution of a battery. The polymer materials are particularly preferably polyolefins such as polypropylene and polyethylene, and most preferably polypropylene or polyethylene, in terms of excellent hydrothermal resistance, acid resistance, and alkali resistance as well as low cost. When the porous substrate 12 is composed of a polymer material, the LDH 14 is particularly preferably incorporated over the entire region of the porous substrate 12 in the thickness direction thereof (for example, most or almost all the pores inside the porous substrate 12 are filled with the LDH 14). As such a polymer porous substrate, a commercially available polymer microporous membrane can preferably be used.

Production Method

The method for producing the LDH separator 10 is not particularly limited, and it is fabricated by appropriately changing the conditions in the methods for producing already known LDH-containing functional layers and composite materials (i.e., LDH separators) (see, for example, Patent Literatures 1 to 5). For example, the LDH-containing functional layer and composite material (i.e., LDH separator) can be produced by (1) preparing a porous substrate, (2) coating a porous substrate with a mixed sol of alumina and titania, and drying the mixture to form an alumina•titania layer, (3) immersing the porous substrate in a raw material aqueous solution containing magnesium ions ($Mg^{2+}$) and urea, and (4) hydrothermally treating the porous substrate in the raw material aqueous solution, and forming the LDH-containing functional layer on the porous substrate and/or in the porous substrate. Due to the presence of urea in the above step (3), ammonia is generated in the solution by utilizing the hydrolysis of urea, increasing the pH value, and the coexisting metal ions form hydroxides to enable to obtain an LDH. Moreover, since the hydrolysis is accompanied by generation of carbon dioxide, an LDH having anions of carbonate ion type can be obtained.

In particular, in the case of fabricating a composite material (i.e., an LDH separator) in which the porous substrate 12 is composed of a polymer material and the LDH 14 is incorporated over the entire region of the porous substrate 12 in the thickness direction thereof, it is preferred to coat the substrate with the mixed sol of alumina and titania in the above (2) in such a procedure as to permeate the mixed sol to the whole or most of the inside of the substrate, which thereby enables to finally fill most or almost all the pores inside the porous substrate with an LDH. The coating method preferably includes, for example, a dip coating and a filtration coating, and the dip coating is particularly preferred. The amount of the mixed sol adhered can be adjusted by adjusting the number of times of coating in the dip coating, etc. After the substrate coated with the mixed sol by the dip coating, etc., was dried, the above steps (3) and (4) may be carried out.

When the porous substrate 12 is composed of a polymer material, it is preferred to subject the LDH separator obtained by the above method, etc., to pressing treatment, whereby an LDH separator excellent in a higher denseness can be obtained. The pressing method may be, for example, roll pressing, uniaxial pressing, or CIP (cold isostatic pressing), and it is not particularly limited, but is preferably roll pressing. This pressing is preferred in that it sufficiently fills up pores of the porous substrate with an LDH by softening the polymer porous substrate during heating. For sufficient softening, for example, in the case of polypropylene or polyethylene, it is preferred to heat the polymer at 60 to 200° C. Pressing such as roll pressing in such a temperature range can significantly reduce the residual pores of the LDH separator. As a result, the LDH separator can be extremely highly densified and therefore short circuits caused by zinc dendrites can be inhibited even more effectively. In roll pressing, morphology of residual pores can be controlled by appropriately adjusting a roll gap and a roll temperature, whereby an LDH separator having a desired denseness can be obtained.

Zinc Secondary Battery

The LDH separator of the present invention is preferably applied to a zinc secondary battery. Therefore, according to a preferred aspect of the present invention, a zinc secondary battery comprising an LDH separator is provided. A typical zinc secondary battery comprises a positive electrode, a negative electrode, and an electrolytic solution, and the positive electrode and the negative electrode are separated from each other with an LDH separator interposed therebetween. The zinc secondary battery of the present invention is not particularly limited provided that it is a secondary battery in which zinc is used as a negative electrode and an electrolytic solution (typically an alkali metal hydroxide aqueous solution) is used. Therefore, it can be a nickel-zinc secondary battery, a silver oxide-zinc secondary battery, a manganese oxide-zinc secondary battery, a zinc-air secondary battery, or various other alkaline-zinc secondary batteries. For example, a positive electrode preferably comprises nickel hydroxide and/or nickel oxyhydroxide whereby the zinc secondary battery forms a nickel-zinc secondary battery. Alternatively, the positive electrode may be an air electrode whereby the zinc secondary battery forms a zinc-air secondary battery.

Solid Alkaline Fuel Cell

The LDH separator of the present invention can also be applied to a solid alkaline fuel cell. Namely, by using the LDH separator in which pores of the porous substrate are filled up with the LDH and highly densified, the solid alkaline fuel cell can be provided, which is capable of effectively inhibiting reduction of an electromotive force due to permeation of a fuel to an air electrode side (for example, crossover of methanol). This is because the permeation of the fuel such as methanol to the LDH separator can be effectively inhibited while exhibiting the hydroxide-ion conductivity of the LDH separator. Therefore, according to another preferred aspect of the present invention, a solid alkaline fuel cell comprising the LDH separator is provided. A typical solid alkaline fuel cell according to the aspect includes an air electrode to which oxygen is supplied, a fuel electrode to which a liquid fuel and/or a gaseous fuel are supplied, and an LDH separator interposed between the fuel electrode and the air electrode.

Other Batteries

The LDH separator of the present invention can be used not only for nickel-zinc batteries and solid alkaline fuel cells, but also for nickel-hydrogen batteries, for example. In this case, the LDH separator functions to block the nitride shuttle (movement of nitric acid groups between electrodes), which is a factor of self-discharge of the battery. Moreover, the LDH separator of the present invention can also be used for a lithium battery (a battery having a negative electrode made of lithium metal), a lithium ion battery (a battery having a negative electrode made of carbon, etc.), or a lithium-air battery, etc.

EXAMPLES

The present invention will be described in more detail with reference to the following examples. The evaluation methods of the LDH separators fabricated in the following examples will be described as follows.

Evaluation 1: Observation of Microstructure

A surface microstructure of an LDH separator was observed by using a scanning electron microscope (SEM, JSM-6610LV, manufactured by JEOL Ltd.) at an accelerating voltage of 10 to 20 kV.

Evaluation 2: Elemental Analysis Evaluation (EDS)

Composition analysis was carried out on a surface of an LDH separator by using an EDS analyzer (apparatus name: X-act, manufactured by Oxford Instruments), and a composition ratio (atomic ratio) of Mg:Al:Ti and an atomic ratio (Ti/Al) were calculated. This analysis was carried out by 1) capturing an image at an accelerating voltage of 20 kV and a magnification of 5,000 times, 2) carrying out a three-point analysis at about 5 μm intervals in a point analysis mode, 3) repeating the above 1) and 2) once more, and 4) calculating an average value of a total of 6 points.

Evaluation 3: Identification of LDH

An XRD profile was obtained by measuring a crystal phase of an LDH separator with an X-ray diffractometer (RINT TTR III manufactured by Rigaku Corporation) under the measurement conditions of voltage: 50 kV, current value: 300 mA, and measurement range: 5 to 40°. Identification of the obtained XRD profile was carried out by using a diffraction peak of the LDH (hydrotalcites compound) described in JCPDS card No. 35-0964.

Evaluation 4: He Permeation Measurement

Figure 2A:
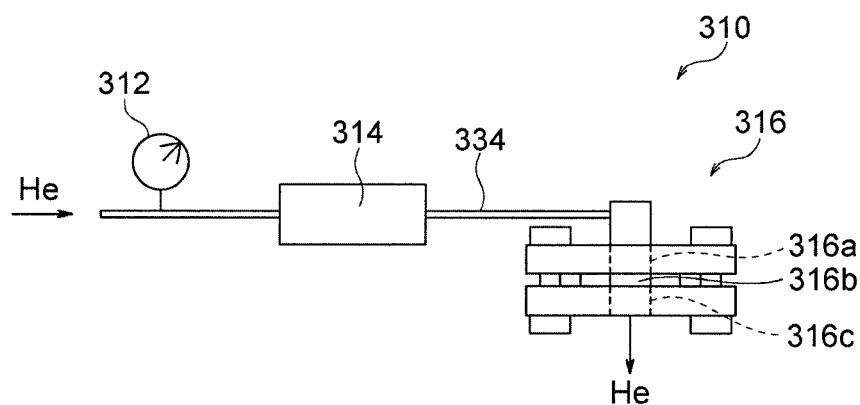
FIG. 2A is a conceptual view illustrating an example of the He permeability measurement system used in Examples 1 to 5.
Figure 2B:
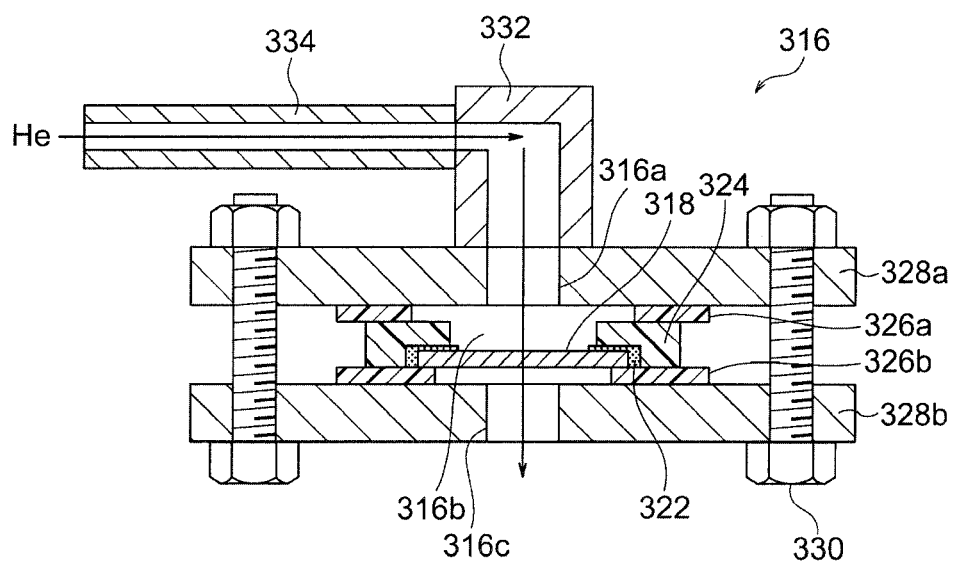
FIG. 2B is a schematic cross-sectional view of the sample holder used in the measurement system shown in FIG. 2A and the peripheral composition thereof.

From the viewpoint of a He permeability, a He permeation test was carried out as follows in order to evaluate a denseness of an LDH separator. First, the He permeability measurement system 310 shown in FIG. 2A and FIG. 2B was build up. The He permeability measurement system 310 was constituted so that He gas from a gas cylinder filled with the He gas was supplied to a sample holder 316 via a pressure gauge 312 and a flow meter 314 (digital flow meter), and it was permeated from one surface of an LDH separator 318 held in the sample holder 316 to the other surface and discharged.

The sample holder 316 has a structure including a gas supply port 316a, a closed space 316b, and a gas discharge port 316c, and was assembled as follows. First, an adhesive 322 was applied along an outer circumference of the LDH separator 318 and attached to a jig 324 (made of an ABS resin) having an opening in the center. A packing made of butyl rubber was arranged as sealing members 326a and 326b at the upper end and lower end of the jig 324, and was further sandwiched by support members 328a and 328b (made of PTFE) having openings that were made from flanges, from the outside of the sealing members 326a and 326b. In this manner, the closed space 316b was partitioned by the LDH separator 318, the jig 324, the sealing member 326a, and the support member 328a. The support members 328a and 328b were firmly tightened to each other by a fastening means 330 using screws so that He gas did not leak from portions other than a gas discharge port 316c. A gas supply pipe 334 was connected to the gas supply port 316a of the sample holder 316 thus assembled via a joint 332.

Next, He gas was supplied to the He permeability measurement system 310 via the gas supply pipe 334, and was permeated through the LDH separator 318 held in the sample holder 316. At this time, a gas supply pressure and a flow rate were monitored by the pressure gauge 312 and the flow meter 314. After permeating the He gas for 1 to 30 minutes, a He permeability was calculated. The He permeability was calculated by the formula of F/(P×S) using a permeation amount F ($cm^3$/min) of the He gas per unit time, a differential pressure P (atm) applied to the LDH separator when the He gas permeates, and a membrane area S ($cm^2$) through which the He gas permeates. The permeation amount F ($cm^3$/min) of the He gas was read directly from the flow meter 314. Moreover, as the differential pressure P, a gauge pressure read from the pressure gauge 312 was used. The He gas was supplied so that the differential pressure P was in the range of 0.05 to 0.90 atm.

Evaluation 5: Measurement of Ionic Conductivity

Figure 3:
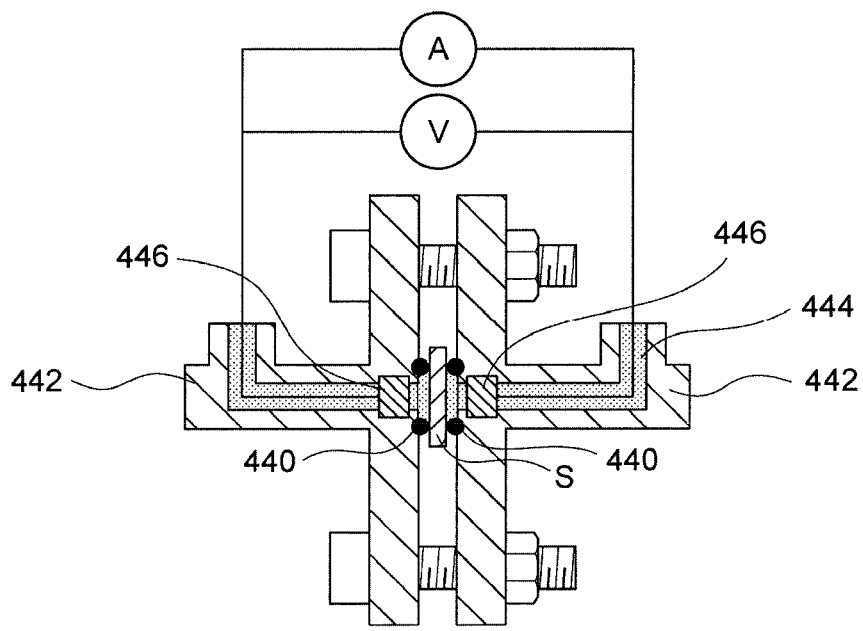
FIG. 3 is a schematic cross-sectional view of the electrochemical measurement system used in Examples 1 to 5.
Figure 4A:
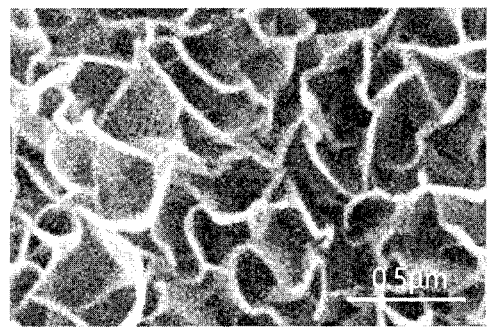
FIG. 4A is a surface SEM image of the LDH separator fabricated in Example 1.
Figure 4B:
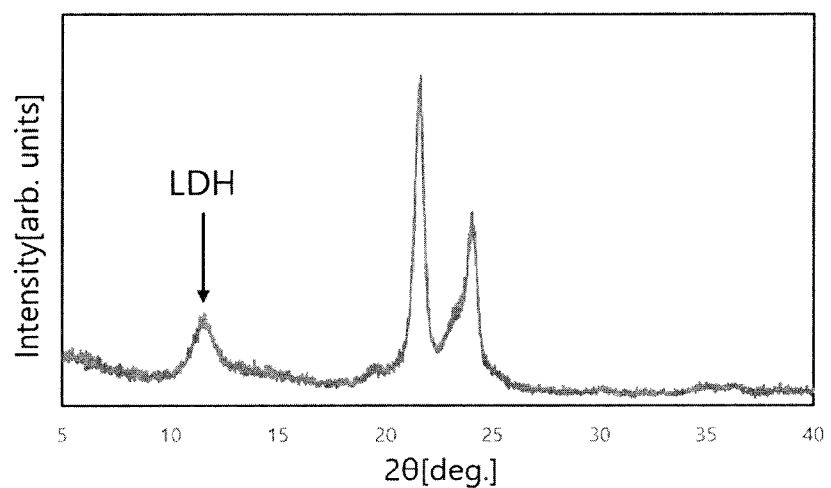
FIG. 4B is an X-ray diffraction result of the LDH separator fabricated in Example 1.
Figure 5A:
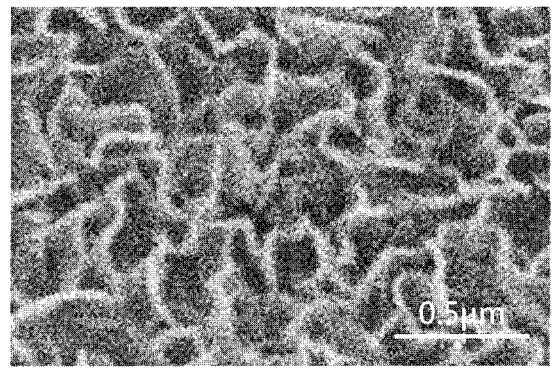
FIG. 5A is a surface SEM image of the LDH separator fabricated in Example 2.
Figure 5B:
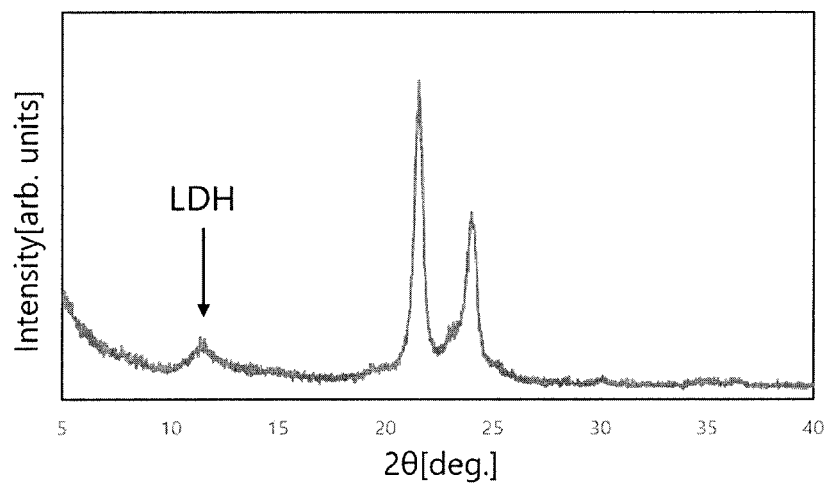
FIG. 5B is an X-ray diffraction result of the LDH separator fabricated in Example 2.
Figure 6A:
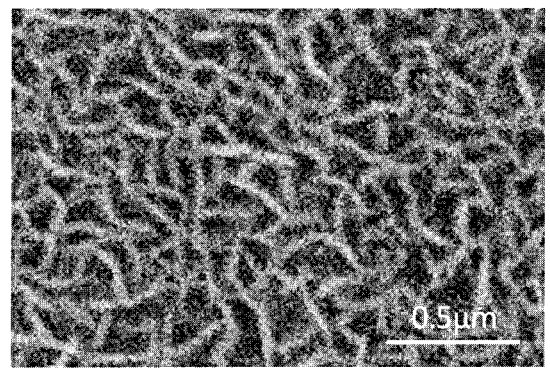
FIG. 6A is a surface SEM image of the LDH separator fabricated in Example 3.
Figure 6B:
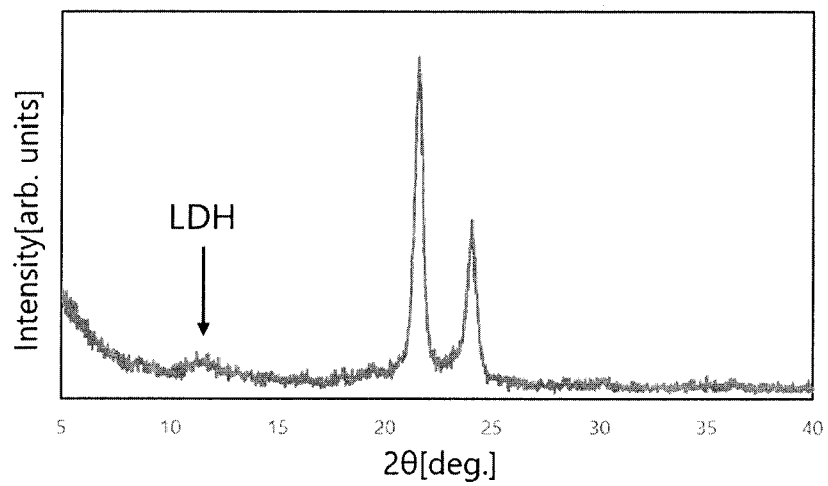
FIG. 6B is an X-ray diffraction result of the LDH separator fabricated in Example 3.
Figure 7A:
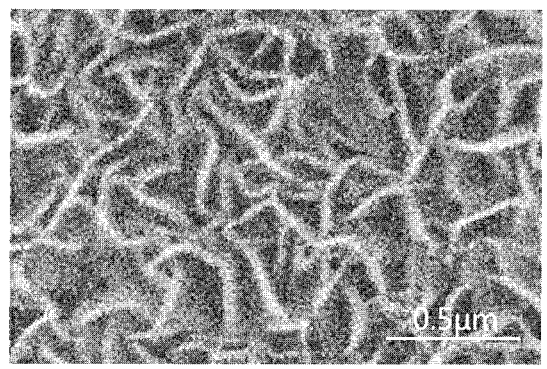
FIG. 7A is a surface SEM image of the LDH separator fabricated in Example 4.
Figure 7B:
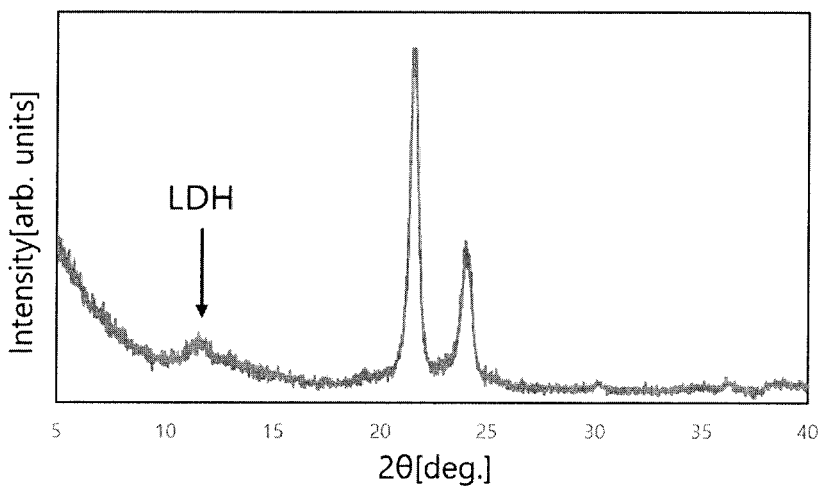
FIG. 7B is an X-ray diffraction result of the LDH separator fabricated in Example 4.

A conductivity of an LDH separator in an electrolytic solution was measured as follows by using the electrochemical measurement system shown in FIG. 3. The LDH separator sample S was sandwiched with 1 mm thick silicone packings 440 from both sides of the sample and incorporated into a PTFE flange type cell 442 having an inner diameter of 6 mm. As an electrode 446, a nickel wire mesh of #100 mesh was incorporated into the cell 442 in a cylindrical fashion having a diameter of 6 mm, so that a distance between the electrodes was 2.2 mm. As an electrolytic solution 444, a 5.4 M KOH aqueous solution was filled in the cell 442. By using an electrochemical measurement system (potentio/galvanostat-frequency response analyzer manufactured by Solartron Analytical, type:1287A and 1255B), measurement was carried out under the conditions of a frequency range of 1 MHz to 0.1 Hz and an applied voltage of 10 mV, and an intercept of a real number axis was used as a resistance of the LDH separator sample S. The same measurement as above was carried out without the LDH separator sample S, and a blank resistance was also determined. The difference between the resistance of the LDH separator sample S and the blank resistance was defined as a resistance of the LDH separator. The conductivity was determined by using the resistance of the obtained LDH separator and a thickness and an area of the LDH separator.

Evaluation 6: Evaluation of Dendrite Resistance (Cycle Test)

A cycle test was carried out as follows to evaluate an effect of inhibiting a short circuit (dendrite resistance) caused by zinc dendrites of an LDH separator. First, each of a positive electrode (containing nickel hydroxide and/or nickel oxyhydroxide) and a negative electrode (containing zinc and/or zinc oxide) was wrapped with a nonwoven fabric, and was welded with a current extraction terminal. The positive electrode and the negative electrode thus prepared were opposed to each other via an LDH separator, sandwiched between laminated films provided with a current extraction port, and heat-sealed on three sides of the laminated film. An electrolytic solution (a solution in which 0.4 M zinc oxide was dissolved in a 5.4 M KOH aqueous solution) was added to the cell container thus obtained with an upper portion being opened, and the electrolytic solution was sufficiently permeated through the positive electrode and the negative electrode by vacuum evacuation, etc. Thereafter, the remaining one side of the laminated film was also heat-sealed to form a simple sealed cell. Chemical conversion was carried out on the simple sealed cell with 0.1 C charge and 0.2 C discharge by using a charge/discharge apparatus (TOSCAT3100 manufactured by Toyo System Co., Ltd.). Then, a 1 C charge/discharge cycle was carried out. While the charge/discharge cycle was repeated under the same conditions, a voltage between the positive electrode and the negative electrode was monitored with a voltmeter, and presence or absence of a sudden voltage drop accompanying a short circuit due to zinc dendrites between the positive electrode and the negative electrode (specifically, a voltage drop of 5 mV or more with respect to the voltage plotted immediately before), was examined and evaluated according to the following criteria:

No short circuit: The above sudden voltage drop was not observed upon charge even after 300 cycles.

Short circuiting: The above sudden voltage drop was observed upon charge in less than 300 cycles.

Examples 1 to 4

(1) Preparation of Polymer Porous Substrate

A commercially available polyethylene microporous membrane having a porosity of 50%, an average pore diameter of 0.1 μm, and a thickness of 20 μm was prepared as a polymer porous substrate and cut out to a size of 2.0 cm×2.0 cm.

(2) Alumina·titania Sol Coating on Polymer Porous Substrate

An amorphous alumina solution (Al-ML15, manufactured by Taki Chemical Co., Ltd.) and a titanium oxide sol solution (M6, manufactured by Taki Chemical Co., Ltd.) were mixed so as to have the Ti/Al ratio (molar ratio) shown in Table 1, to prepare a mixed sol. The substrate prepared in (1) above was coated with the mixed sol by dip coating. The dip coating was carried out by immersing the substrate in 100 ml of the mixed sol followed by pulling it up vertically, and drying it at room temperature for 3 hours.

(3) Preparation of Raw Material Aqueous Solution

Magnesium nitrate hexahydrate ($Mg(NO_3)_2 \cdot 6H_2O$, manufactured by Kanto Chemical Co., Inc.) and urea (($NH_2)_2CO$, manufactured by Sigma-Aldrich Co. LLC) were prepared as raw materials. The magnesium nitrate hexahydrate was weighed to 0.03 mol/L and placed in a beaker, and ion-exchanged water was added thereto to have a total volume of 75 ml. After stirring the obtained solution, the urea weighed at a ratio that urea/$NO_3^-$ (molar ratio)=8 was added to the solution, and the mixture was further stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH was formed on the surface and the inside of the substrate by subjecting it to hydrothermal treatment at a hydrothermal temperature of 90° C. for 24 hours. With an elapse of the predetermined time, the substrate was taken out from the airtight container, washed with ion-exchanged water, and dried at 70° C. for 10 hours to form an LDH inside the pores of the porous substrate. Thus, an LDH separator was obtained.

(5) Densification by Roll Pressing

The LDH separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH separator.

(6) Evaluation Result

Evaluations 1 to 6 were carried out on the obtained LDH separator. The results were as follows.

Evaluation 1: The SEM images of surface microstructures of the LDH separators (before having been roll-pressed) obtained in Examples 1, 2, 3, and 4 were as shown in FIGS. 4A, 5A, 6A, and 7A, respectively.

Evaluation 2: As a result of EDS elemental analysis, LDH constituent elements Mg, Al, and Ti were detected on the surface of the LDH separator. Moreover, the atomic ratios of Mg, Al, and Ti on the surface of each LDH separator and the atomic ratios of Ti/Al, calculated by EDS elemental analysis were as shown in Table 1.

Evaluation 3: FIGS. 4B, 5B, 6B, and 7B show the XRD profiles obtained in Examples 1, 2, 3, and 4, respectively. From the peak in the vicinity of 2θ=11.5° in the obtained XRD profile, it was identified that the portions of the LDH separators obtained in Examples 1 to 4 other than the porous substrate were LDHs (hydrotalcites compounds). Incidentally, the two peaks observed at 20<2θ°<25 of the XRD profile are peaks derived from polyethylene composing the porous substrate.

Evaluation 4: As shown in Table 1, the extremely high denseness exhibiting the He permeability of 0.0 cm/min·atm was confirmed in each of Examples 1 to 4.

Evaluation 5: As shown in Table 1, the high ionic conductivity was confirmed in each of Examples 1 to 4.

Evaluation 6: As shown in Table 1, the excellent dendrite resistance was confirmed in that there was no short circuit due to zinc dendrites even after 300 cycles in each of Examples 1 to 4.

Example 5 (Comparison)

An LDH separator was fabricated and evaluated in the same manner as in Example 1, except that a polymer porous substrate was coated with an alumina sol without addition of a titania sol in (2) above.

Figure 8A:
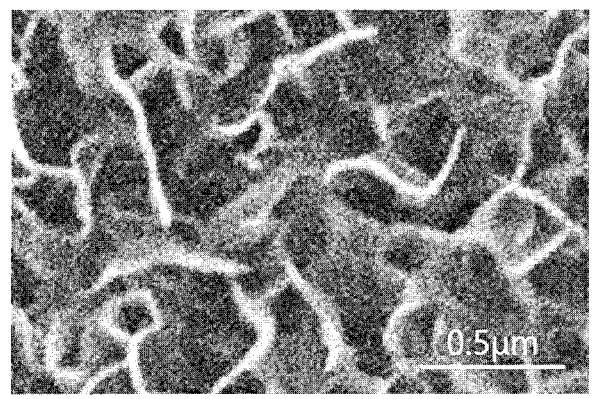
FIG. 8A is a surface SEM image of the LDH separator fabricated in Example 5 (comparison).

Evaluation 1: The SEM image of surface microstructure of the LDH separator obtained in Example 5 was as shown in FIG. 8A.

Evaluation 2: As a result of EDS elemental analysis, Mg and Al which were LDH constituent elements, were detected on a surface of the LDH separator, but Ti was not detected. The composition ratios (atomic ratios) of Mg and Al on the surface of the LDH separator calculated by EDS elemental analysis were as shown in Table 1.

Figure 8B:
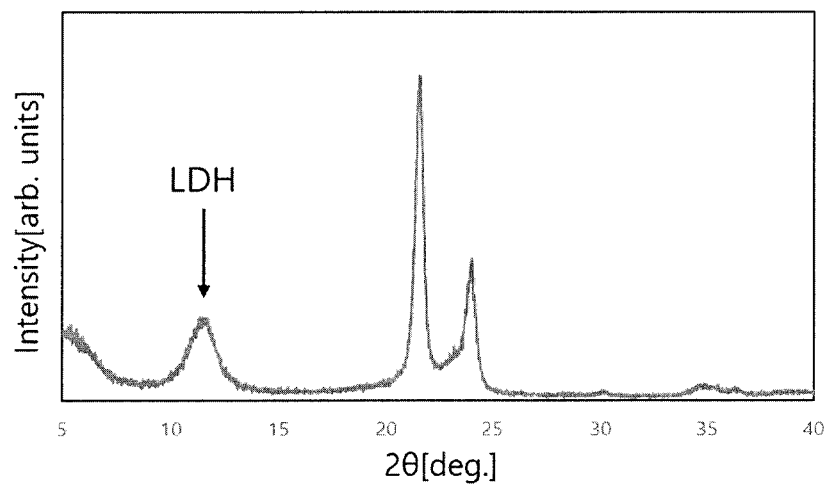
FIG. 8B is an X-ray diffraction result of the LDH separator fabricated in Example 5 (comparison).

Evaluation 3: FIG. 8B shows the XRD profile obtained in Example 5. From the peak in the vicinity of 2θ=11.5° in the obtained XRD profile, it was identified that the portion of the LDH separator obtained in Example 5 other than the porous substrate was an LDH (hydrotalcites compound). Incidentally, the two peaks observed at 20<2θ°<25 of the XRD profile are peaks derived from polyethylene composing the porous substrate.

Evaluation 4: As shown in Table 1, the extremely high denseness exhibiting the He permeability of 0.0 cm/min·atm was confirmed.

Evaluation 5: As shown in Table 1, the high ionic conductivity was confirmed.

Evaluation 6: As shown in Table 1, it was found that the dendrite resistance was inferior because a short circuit due to zinc dendrites occurred in less than 300 cycles.

TABLE 1

| | LDH composition | Fabrication conditions Charging Ti/Al ratio (molar ratio) | LDH separator evaluation | | | | |
|---|---|---|---|---|---|---|---|
| | | | Composition ratio (atomic ratio) | Ti/Al (atomic ratio) | He permeability (cm/ min · atm) | Ionic conductivity (mS/cm) | Dendrite resistance Presence or absence of short circuit |
| Ex. 1 | Mg—(Al,Ti)—LDH | 2 | Mg:Al:Ti = 53:21:26 | 1.2 | 0.0 | 3.0 | Absence |
| Ex. 2 | Mg—(Al,Ti)—LDH | 4 | Mg:Al:Ti = 34:11:55 | 5.1 | 0.0 | 2.7 | Absence |
| Ex. 3 | Mg—(Al,Ti)—LDH | 6 | Mg:Al:Ti = 33:7:60 | 8.6 | 0.0 | 3.0 | Absence |
| Ex. 4 | Mg—(Al,Ti)—LDH | 8 | Mg:Al:Ti = 26:6:68 | 11.3 | 0.0 | 2.0 | Absence |
| Ex. 5* | Mg—Al—LDH | — | Mg:Al = 67:32 | — | 0.0 | 2.7 | Presence |

The code *denotes a Comparative Example.

Figure 9A:
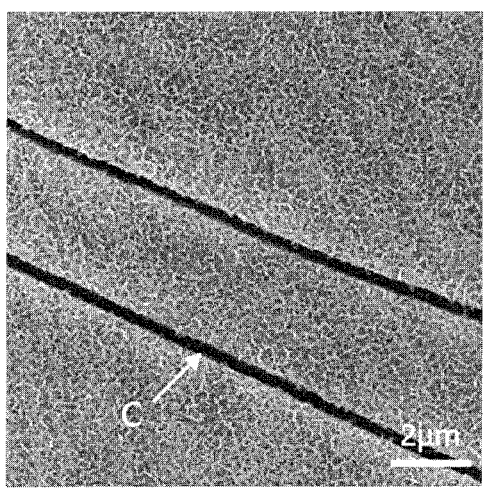
FIG. 9A is a surface SEM image of an LDH separator having cracks.
Figure 9B:
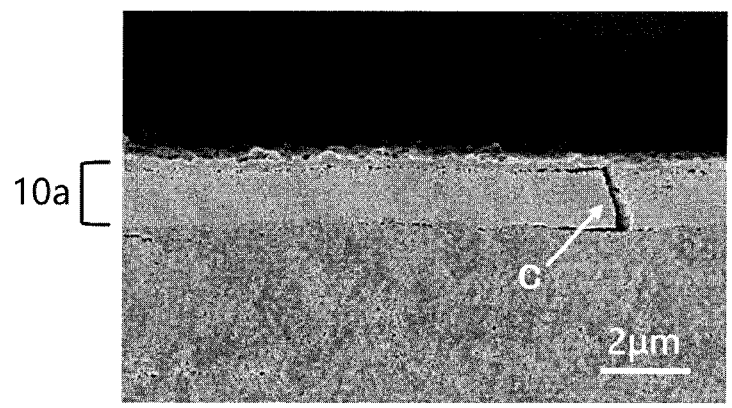
FIG. 9B is a cross-sectional SEM image of the LDH separator shown in FIG. 9A.

By the way, as shown in FIG. 9A and FIG. 9B, the crack C may be present in the LDH surface layer 10a composing the surface of the LDH separator 10. The crack C may be present in the width direction and/or the longitudinal direction of the LDH separator 10 or the entire surface of the LDH separator 10 provided that it does not affect the strength of the LDH separator 10. The crack C preferably has a depth of 0.1 to 5 μm and a width of 0.1 to 30 μm, whereby compatibility with an electrolytic solution is improved, and aging in a battery fabrication process becomes unnecessary. It should be noted that the aging is usually carried out in order to stabilize an ionic conductivity of a separator by uniformly bringing it in contact with an electrolytic solution after battery fabrication. The LDH separator having cracks can be fabricated by coating the porous substrate with the mixed sol solution and then drying it by rapid drying in the above method for fabricating the LDH separators.

What is claimed is:

1. An LDH separator comprising a porous substrate and a layered double hydroxide (LDH) that fills up pores of the porous substrate,
    wherein the LDH is composed of a plurality of hydroxide base layers composed of Mg, Al, Ti, and OH groups, or composed of Mg, Al, Ti, OH groups, and unavoidable impurities, and interlayers which are interposed between the plurality of hydroxide base layers and composed of anions and $H_2O$, and
    wherein an atomic ratio of Ti/Al in the LDH, determined by energy dispersive X-ray analysis (EDS), is 1.2 to 11.3.

2. The LDH separator according to claim 1, wherein an atomic ratio of Ti/(Mg+Ti+Al) in the LDH, determined by energy dispersive X-ray analysis (EDS), is 0.1 to 0.7.

3. The LDH separator according to claim 1, wherein an atomic ratio of Al/(Mg+Ti+Al) in the LDH, determined by energy dispersive X-ray analysis (EDS), is 0.05 to 0.4.

4. The LDH separator according to claim 1, wherein an atomic ratio of Mg/(Mg+Ti+Al) in the LDH, determined by energy dispersive X-ray analysis (EDS), is 0.2 to 0.7.

5. The LDH separator according to claim 1, wherein the porous substrate is composed of a polymer material.

6. The LDH separator according to claim 5, wherein the polymer material is selected from the group consisting of polystyrene, polyether sulfone, polypropylene, an epoxy resin, polyphenylene sulfide, a fluororesin, cellulose, nylon, and polyethylene.

7. The LDH separator according to claim 1, wherein the LDH separator has an ionic conductivity of 2.0 mS/cm or more.

8. The LDH separator according to claim 1, wherein the LDH separator has a He permeability per unit area of 10 cm/min·atm or less.

9. A zinc secondary battery comprising the LDH separator according to claim 1.

10. A solid alkaline fuel cell comprising the LDH separator according to claim 1.

* * * * *